United States Patent
Wu et al.

(10) Patent No.: US 7,633,937 B2
(45) Date of Patent: Dec. 15, 2009

(54) METHODS AND APPARATUS FOR SWITCHING BETWEEN METRO ETHERNET NETWORKS AND EXTERNAL NETWORKS

(75) Inventors: Michael Wu, Palo Alto, CA (US); John Vickroy, Fremont, CA (US); Atri Indiresan, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 836 days.

(21) Appl. No.: 10/664,591

(22) Filed: Sep. 19, 2003

(65) Prior Publication Data

US 2005/0063397 A1    Mar. 24, 2005

(51) Int. Cl.
    *H04L 12/56* (2006.01)
(52) U.S. Cl. .................. 370/389; 370/401
(58) Field of Classification Search ............ 370/395.53, 370/395.5, 389, 392, 380, 401, 402, 403, 370/229, 235, 238.1, 395.3, 395.21, 395.31, 370/395.52

See application file for complete search history.

(56) References Cited

U.S. PATENT DOCUMENTS

| | | | |
|---|---|---|---|
| 6,633,565 B1 * | 10/2003 | Bronstein et al. | 370/392 |
| 7,092,389 B2 * | 8/2006 | Chase et al. | 370/389 |
| 7,113,512 B1 * | 9/2006 | Holmgren et al. | 370/395.53 |
| 7,257,121 B2 * | 8/2007 | Kuhl et al. | 370/395.5 |
| 7,277,442 B1 * | 10/2007 | Holmgren et al. | 370/395.53 |
| 2002/0101870 A1 | 8/2002 | Chase et al. | |
| 2003/0142674 A1 * | 7/2003 | Casey | 370/393 |
| 2004/0017816 A1 * | 1/2004 | Ishwar et al. | 370/395.53 |
| 2004/0047353 A1 * | 3/2004 | Umayabashi et al. | 370/395.63 |
| 2004/0165600 A1 * | 8/2004 | Lee | 370/395.53 |
| 2004/0202157 A1 * | 10/2004 | Chase et al. | 370/389 |
| 2005/0053079 A1 * | 3/2005 | Havala | 370/400 |
| 2008/0212598 A1 * | 9/2008 | Kolli et al. | 370/409 |

FOREIGN PATENT DOCUMENTS

EP    1548993    5/2005

OTHER PUBLICATIONS

Martini et al., "Internet Draft-ietf-pwe3-ethernet-encap-03.txt: Encapsulation Methods for Transport of Ethernet Frames over IP/MPLS Networks" IETF Network Working Group, Jun. 2003.
Sajassi et al., "Internet Draft draft-sajassi-vpls-architectures-00.txt: VPLS Architectures" IETF PPVN Working Group, Feb. 20, 2002.

(Continued)

*Primary Examiner*—Ayaz R Sheikh
*Assistant Examiner*—Chuong T Ho
(74) *Attorney, Agent, or Firm*—Weaver Austin Villeneuve & Sampson LLP (57) ABSTRACT

According to the present invention, methods and apparatus are provided to allow efficient switching of frames for transmission between a Layer 2 Virtual Local Area Network such as a Metro Ethernet Network and an external network. Reserved inner tags are used to identify particular services. In one example, inner tags allow mapping of frames associated with a particular subnetwork onto a particular virtual circuit associated with an ATM network.

20 Claims, 9 Drawing Sheets

OTHER PUBLICATIONS

Lasserre et al., "Internet Draft draft-ietf-12vpn-vpls-ldp-00.txt: Virtual Private LAN Services over MPLS" IETF Provider Provisioned VPN Working Group, Jun. 2003.

Ralph Santitoro, "Metro Ethernet Services—A Technical Overview", www.metroethernetforum.org Feb. 5, 2004.

PCT Search Report, Application No. PCT/US2004/030510, Search Report mailed Apr. 19, 2005.

PCT Written Opinion, Application No. PCT/US2004/030510, Written Opinion mailed Apr. 19, 2005.

Heinanen et al., "Multiprotocol Encapsulation over ATM Adaptation Layer 5" RFC 1483, Jul. 1993.

* cited by examiner

METHODS AND APPARATUS FOR SWITCHING BETWEEN METRO ETHERNET NETWORKS AND EXTERNAL NETWORKS

BACKGROUND OF THE INVENTION

1. Field of the Invention

The present invention generally relates to network switching. More specifically, the present invention provides techniques for effectively and efficiently mapping frames for transmission between Layer 2 Virtual Local Area Networks and external networks.

2. Description of Related Art

A Layer 2 Virtual Local Area Network such as a Metro Ethernet network provides mechanisms for setting up virtual local area networks so that individual local area networks can be seamlessly integrated into a wide area network. An individual node in a first local area network can communicate with a node in a second local area network as though the two nodes were in the same local area network. Metro Ethernet networks allow effective intercommunication between nodes in disparate local area networks.

However, communication with nodes outside of the Metro Ethernet network is limited. For example, to establish communication with an external Internet Protocol (IP) network, each local area network would have to set up separate communications with this external network. In another example, to establish communication with an external ATM network, again each local area network would have to set up links to the ATM network. For communication with external ATM networks, an RFC 1483 bridge can be used to connect individual local area networks with an ATM network. However, a RFC 1483 bridge has scalability limitations.

Consequently, it is desirable to provide techniques for improving the mechanisms and techniques for communications between Metro Ethernet networks and external networks.

SUMMARY OF THE INVENTION

According to the present invention, methods and apparatus are provided to allow efficient switching of frames for transmission between a Layer 2 Virtual Local Area Network such as a Metro Ethernet Network and an external network. Reserved inner tags are used to identify particular services. In one example, inner tags allow mapping of frames associated with a particular subnetwork onto a particular virtual circuit associated with an ATM network.

In one embodiment, a method for receiving frames at a gateway device is provided. A frame is received at a metro ethernet gateway coupled to a metro ethernet network and an external network. The frame has an outer tag value identifying a customer site in a metro ethernet network, an inner tag value, an ethernet packet header, and an ethernet packet payload. The inner tag value that identifies a service provisioned for the customer site is determined. The outer tag and the inner tag are replaced with one or more identifiers for transmission onto the external network.

In another embodiment, a gateway device includes an external network interface, a metro ethernet network interface, and a processor. The external network interface is coupled to an external network. The metro ethernet network interface is coupled to a metro ethernet network. The interface is configured to receive a frame from the metro ethernet network. The frame has an outer tag value, an inner tag value, an ethernet packet header, and an ethernet packet payload. The outer tag value identifies a customer site in the metro ethernet network. The processor is operable to determine that the inner tag value identifies a service provisioned for the customer site and to replace the outer tag and the inner tag with one or more identifiers for transmission onto the external network.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

A wide area network using outer tags and inner tags to identify local area networks and subnets are suitable for implementing specific embodiments of the present invention. In the following description, numerous specific details are set forth in order to provide a thorough understanding of the present invention. The present invention may be practiced without some or all of these specific details. Well-known process operations have not been described in detail in order not to unnecessarily obscure the present invention. Furthermore, the present application's reference to a particular singular entity includes that possibility that the methods and apparatus of the present invention can be implemented using more than one entity, unless the context clearly dictates otherwise.

Figure 1:
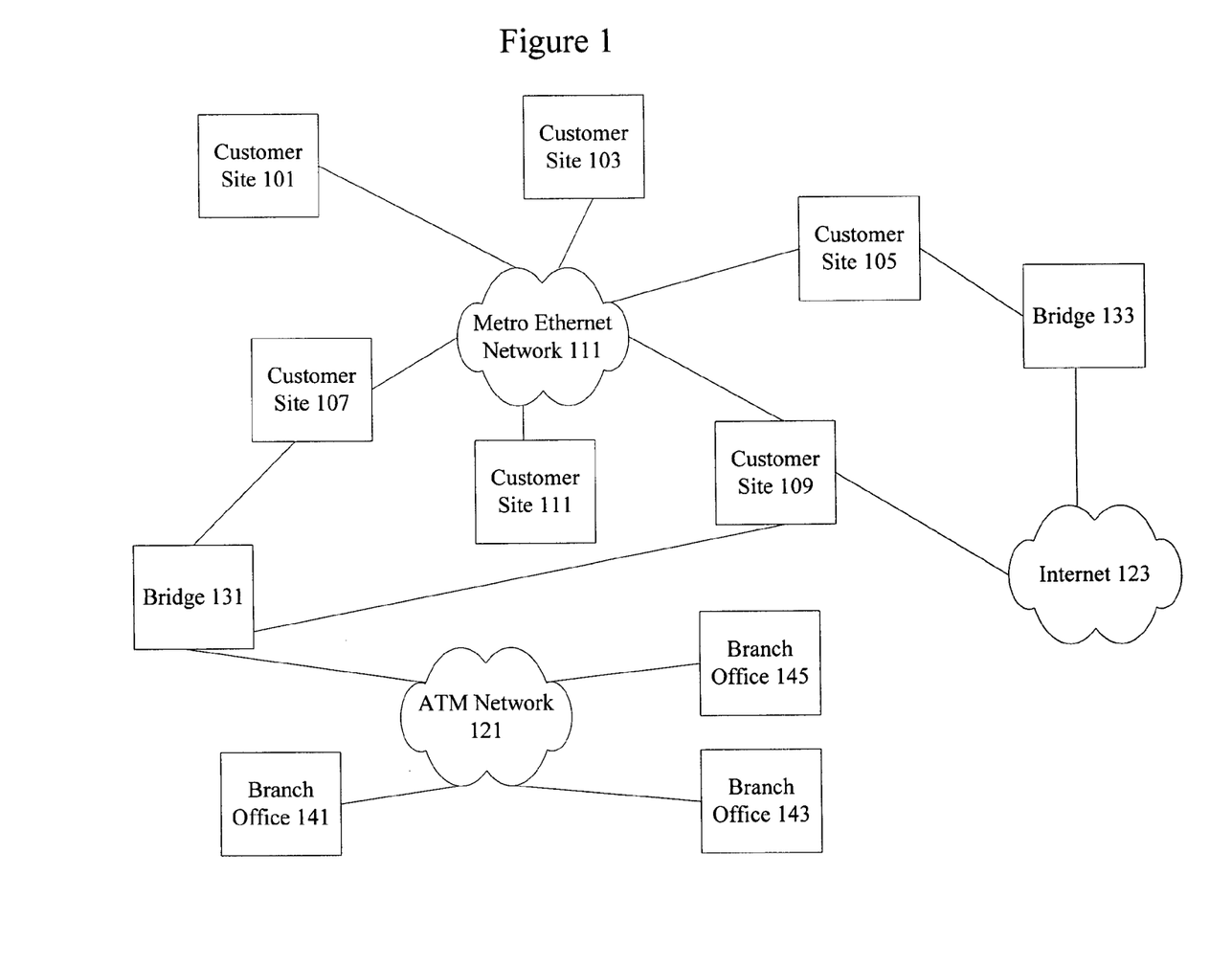
FIG. 1 is a diagrammatic representation of a Metro Ethernet network.

FIG. 1 is a diagrammatic representation of one example of a typical Metro Ethernet network 111 that can be used with the techniques of the present invention. A Metro Ethernet network is also often referred to as a layer 2 virtual private network. Metro Ethernet allows the extension of local area networks efficiently into the wide area network space. The customer site 101 may be a local area network having a number of connected nodes. The connected nodes in the local area network of customer site 101 may communicate with each other using Ethernet. However, in order to communicate with nodes at customer site 103, a Metro Ethernet network is used.

A Metro Ethernet network 111 provides mechanisms for setting up virtual local area networks so that individual nodes at an originating customer site can communicate with another node at a destination customer site as though the other node was part of the originating customer site. That is, the virtual local area network can be set up so that a node at a customer site 105 can easily communicate with a node at customer site 107 transparently, as though the node at customer site 107 was part of the local area network of customer site 105.

One mechanism for allowing nodes at different customer sites to communicate with each other in these virtual local area networks is tag stacking, also referred to as 802.1Q or QinQ. Tag stacking adds information to conventional Ethernet packets transmitted in local area networks. For example, and outer tag can be used to identify a particular customer site associated with an Ethernet packet. An inner tag can be used to identify a particular subnetwork associated with a customer site. According to various embodiments, the outer tag space includes 4000 values and the inner tag space includes 4000 values potentially allowing a theoretical limit of 16 million nodes connected in a Metro Ethernet network 111. However, in typical instances, far fewer nodes are present in Metro Ethernet networks. Since, typically, much fewer than 1.6 million services would be configured, it is inefficient to use a flat table to map these services. The hierarchical approach described below is a more effective implementation.

The outer tag space and the inner tag space allow each customer site to support a large number of nodes. Although each customer site has a unique outer tag number, the nodes in each customer site may be identified using inner tag values that are shared by other nodes at different customer sites.

Figure 2:
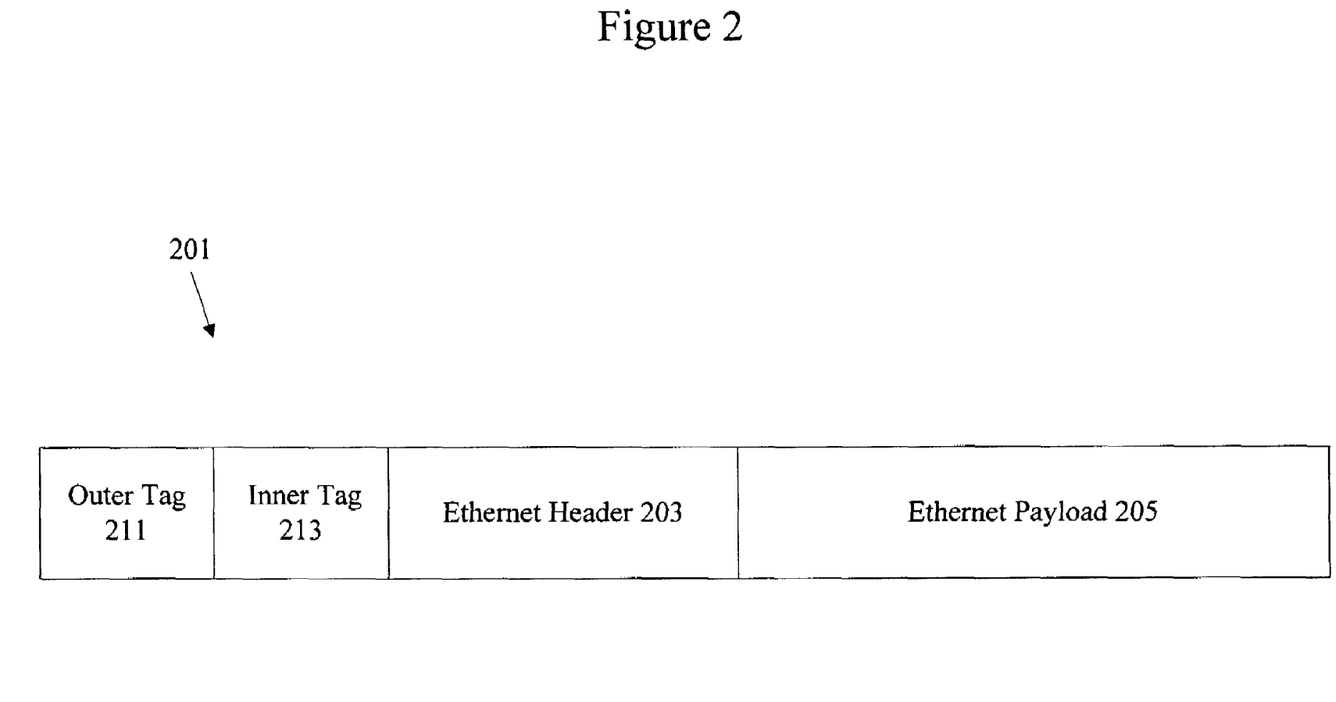
FIG. 2 is a diagrammatic representation of a Metro Ethernet network frame.

FIG. 2 is a diagrammatic representation of a frame having an inner tag as well as an outer tag. A frame having an inner tag and an outer tag along with Ethernet data is referred to herein as a QinQ frame. The QinQ frame includes an Ethernet header 203 as well as an Ethernet payload 205. Other fields, flags, or optional identifiers may be included as well. The outer tag 211 identifies a particular customer site connected to a Metro Ethernet network. The customer site may include many nodes interconnected using a local area network. The inner tag 213 identifies a particular subnet associated with the customer site. It should be noted that the diagrammatic representation of the frame is provided for contextual purposes. Other elements may be included or the arrangement of elements in the frame may vary. Hence is it incorrect to show the tags as the outermost elements. In one example, the ethernet header has a DMAC, SMAC, and an ethertype and is not contiguous with inner and outer tags.

By using outer tag and inner tags, Metro Ethernet networks allow the creation of virtual local area networks that allow relatively transparent communications between nodes at different customer sites. Although Metro Ethernet networks provide effective connectivity between local area networks at customer sites such as customer site 101, 103, 105, 107, 109, and 111, interconnectivity with nodes outside the Metro Ethernet network are limited.

Figure 3:
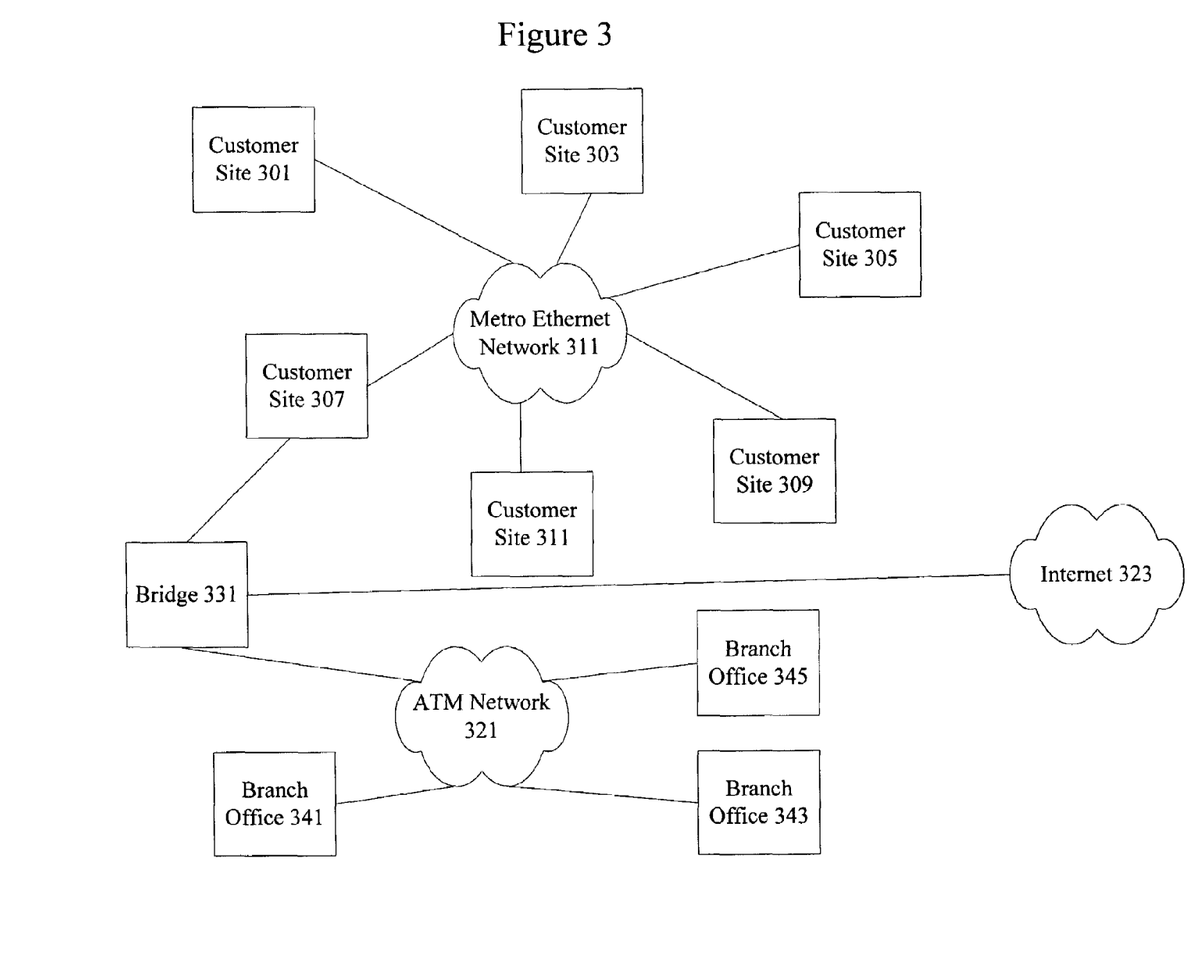
FIG. 3 is a diagrammatic representation of a Metro Ethernet network coupled to external networks.

FIG. 3 is a diagrammatic representation showing a Metro Ethernet network connected to external networks. Any network connected to a Metro Ethernet network by way of a bridge using some form of address mapping is referred to herein as an external network. For example, the Metro Ethernet network may be connected to external networks such as ATM networks, other frame relay networks, or IP networks such as the Internet 323. For a node at customer site 307 to connect with a branch office 345 at an ATM network 321, a separate interface is provided at the customer site 307 to connect to a bridge. Consequently, the customer site 307 includes an interface to the Metro Ethernet network 311 as well as an interface to an ATM network 321 through a bridge.

While a local area network at customer site 307 may be a broadcast type network such as Ethernet, an ATM network is a circuit based network. Consequently, messages are typically mapped at a bridge 331 to particular ATM circuits based on MAC addresses associated with various Ethernet packets. However, conventional mapping of Mac addresses to virtual circuits only allows very limited number of virtual circuits for the customer site. Furthermore, although nodes at a customer site 307 may be able to transmit to branch offices 341, 343, and 345, nodes at a customer site 309 may not be able to. In order for nodes at a customer site 309 to be able to transmit onto the ATM network 321, a connection is added between bridge 331 and customer site 309. Although customer sites 307 and 309 are both connected to ATM network 321, nodes at other customer sites are still unable to transmit to the ATM network.

Although customer site 305 and customer site 309 are connected to the Internet 323 through bridge 333, other customer sites are unable to transmit data over the Metro Ethernet network 311 and eventually onto the Internet 323. Each customer site is thus forced to have its own bridges to external networks. Multiple links and multiple interfaces are needed to provide connections to external networks. For example, each customer site may have to have a link to an external ATM network, a link to the Internet, and a link to another frame relay network.

Figure 4:
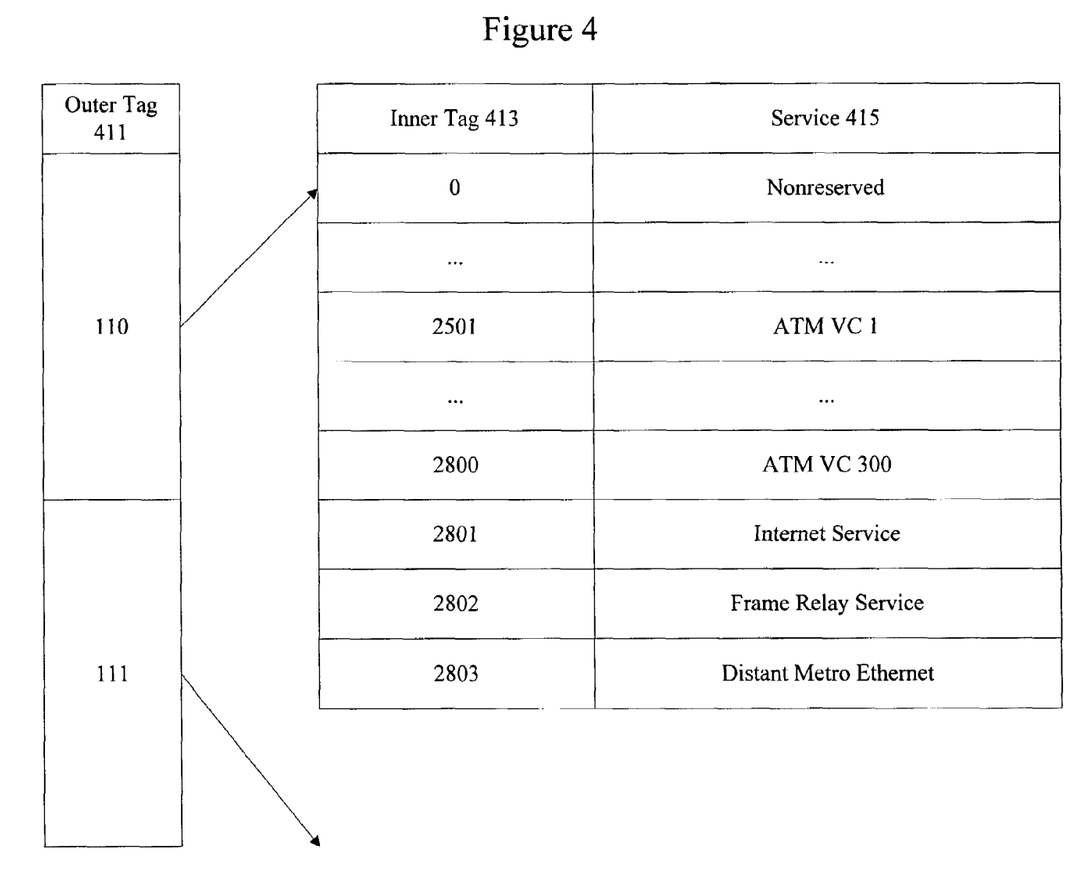
FIG. 4 is a diagrammatic representation showing a services mapping table.

FIG. 4 is a diagrammatic representation showing one mechanism for mapping outer tag and inner tag information to provisioned services. As noted above, the typical outer tag space of 4000 values and the typical inner tag space of 4000 values leads to 1.6 million possible entries if a table were used to directly mapped tag pairs to services. Consequently, a table is typically not used based on current technological constraints. However, tables could possibly be used if technology evolves to allow the administration of 1.6 million entry tables.

According to various embodiments, outer tags 411 are maintained in a first table. Some outer tags may be associated with particular customer sites. Other outer tags may not be associated with any entity. Some customer sites, may have mapping services provisioned while other customer sites may not have mapping services provisioned. In one example, outer tags with mapping services provisioned point to particular inner tag tables. Each inner tag table may be associated with a particular outer tag. Some inner tag values may be associated with particular services, others may be associated with particular subnetworks, while still other inner tags are unused. In one example, the inner tag table holds values identifying particular subnetworks and values mapping particular services. For example, inner tag 2500 is a non-reserved inner tag used to identify subnetworks associated with a customer site. Other inner tag values 2501 through 2803 may be reserved inner tag values.

Any inner tag value used to provide services to a particular customer site is referred to herein as a reserved inner tag. For example, reserved inner tag 2501 to reserved inner tag 2800 are mapped to ATM virtual circuits 1 through 300. An inner tag value 2801 is mapped to an Internet service. An inner tag value 2802 is mapped to a frame relay service. An inner tag 2803 is mapped to a distant Metro Ethernet service. When a service mapping bridge receives an outer tag and an inner tag frame, it can reference the outer tag to locate an inner tag table. The inner tag table can then be referenced by the bridge to determine what services the outer and inner tag frame should be mapped to.

Figure 5:
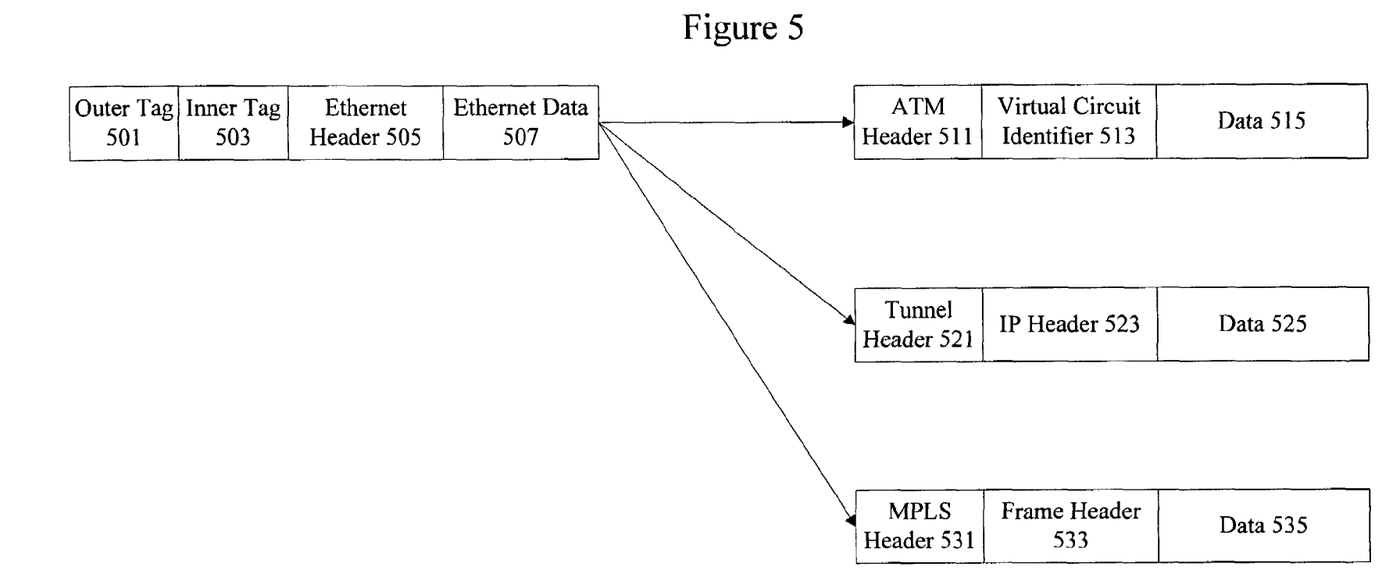
FIG. 5 is a diagrammatic representation showing frame processing.

FIG. 5 is a diagrammatic representation showing a Metro Ethernet frame having an outer tag and an inner tag being converted for transmission onto an external network. According to various embodiments, a bridge connecting the Metro Ethernet network to an external network examines the outer tag associated with a received Metro Ethernet frame. The outer tag 501 indicates whether mapping services are provisioned. If mapping services are provisioned, the bridge examines the inner tag 503 to determine if the inner tag is associated with any particular provisioned service. In one example, the inner tags 503 indicates that the frame should be mapped to a particular ATM virtual circuit. The bridge takes the Ethernet header 505 and the Ethernet data 507 and repackages it as an ATM cell.

The ATM cell includes ATM header 511 associated with a virtual circuit 513 and ATM data 515. In another example, the inner tag 503 identifies an IP network service. The bridge removes the outer tag and the inner tag and repackages the data 507 and Ethernet header 505 into an IP tunneling frame. The IP tunneling frame has a tunnel header 521, an IP header 523, and data 525. In yet another example, the inner tag 503 specifies transmission onto a label switching network such as an MPLS network. The bridge repackages the Ethernet header 505 and the data 507 into an MPLS frame. The MPLS frame includes an MPLS header 531, a frame header 533, and data portion 535. It should be noted that the various frames and packets shown may include a variety of other fields and flags not mentioned.

Using a bridge to map reserved inner tag values to provision services provides a variety of benefits. For example, when a service provider wants to offer use of new Metro Ethernet network, the service provider typically has to support seamless integration with existing ATM and frame relay installed nodes. The typical solution is that a customer site such as a headquarters site is upgraded the use the new Metro Ethernet network while branch offices remain on a legacy ATM network. The customer site is provided with interfaces to both the Metro Ethernet network and an external network such as the ATM network connecting various branch offices.

However, a variety of limitations persist, as more line card interfaces are typically needed as an increasing number of branch offices are connected. The MAC address space used to map Ethernet frames for transmission onto particular virtual circuits is also typically a limiting factor. Using the techniques of the present invention, instead of having every individual customer site have interfaces to both the Ethernet network and to external networks, only a small number of nodes on the Metro Ethernet network need to have links to external networks. Other customer sites can send data to external networks through the small number of nodes with external network interfaces. This significantly reduces network complexity and administrative costs.

Figure 6:
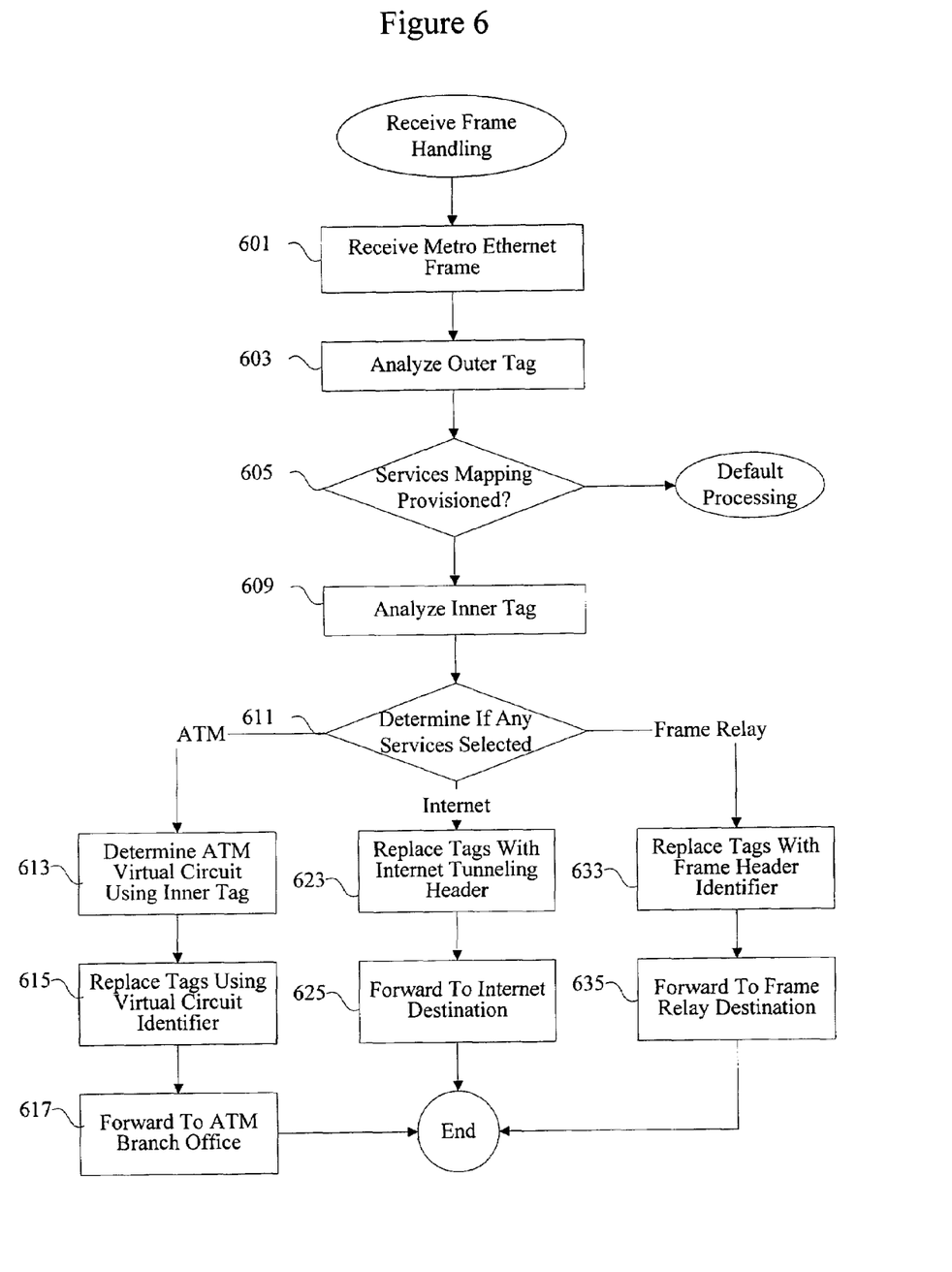
FIG. 6 is a flow process diagram showing transmit frame handling.

FIG. 6 is a flow process diagram showing receive frame handling at a bridge connecting a Metro Ethernet network to an external network. At 601 the bridge receives a natural Ethernet frame. Natural Ethernet frame typically includes an outer tag, in inner tag, and Ethernet header, and Ethernet payload. At 603, the outer tag is analyzed. It is determined if service mapping is provisioned for the particular customer site identified by the outer type. If mapping services is not provisioned, the frames are handled using default processing. If service mapping is provisioned, the inner tag is analyzed at 609. In typical Metro Ethernet applications, the inner tag identifies a subnetworks associated with the customer site.

However, according to various embodiments, portions of the inner tag space are reserved for service mapping. At 611, the bridge determines what if any services are selected based on the value of the inner tag. In some examples, no services are selected and the inner tag may not be a reserved value but instead may simply identify a particular subnetwork. If the inner tag does not identify a reserved value, a bridge or gateway determines if the reserved value corresponds to an ATM circuit at 613. If the inner tag corresponds to a particular ATM virtual circuit, the outer tag and the inner tag of the receive frame are replaced using an ATM header and a corresponding virtual circuit identifier at 615. According to various embodiments, the bridge stores mappings associating ATM virtual circuits and reserved tags. At 617, the ATM frame is forwarded to an ATM branch office.

If the services associated with the reserved inner tag value are frame relay services, the outer and inner tag are replaced with a frame header at 633. According to various embodiments, the frame header information is maintained by the bridge. At 635, data is forwarded to the frame relay destination. If the reserved inner tag value is associated with an Internet service, the outer tag and inner tag are replaced with a tunnel header. The data is encapsulated by the tunneling header and forwarded to an Internet destination.

Figure 7:
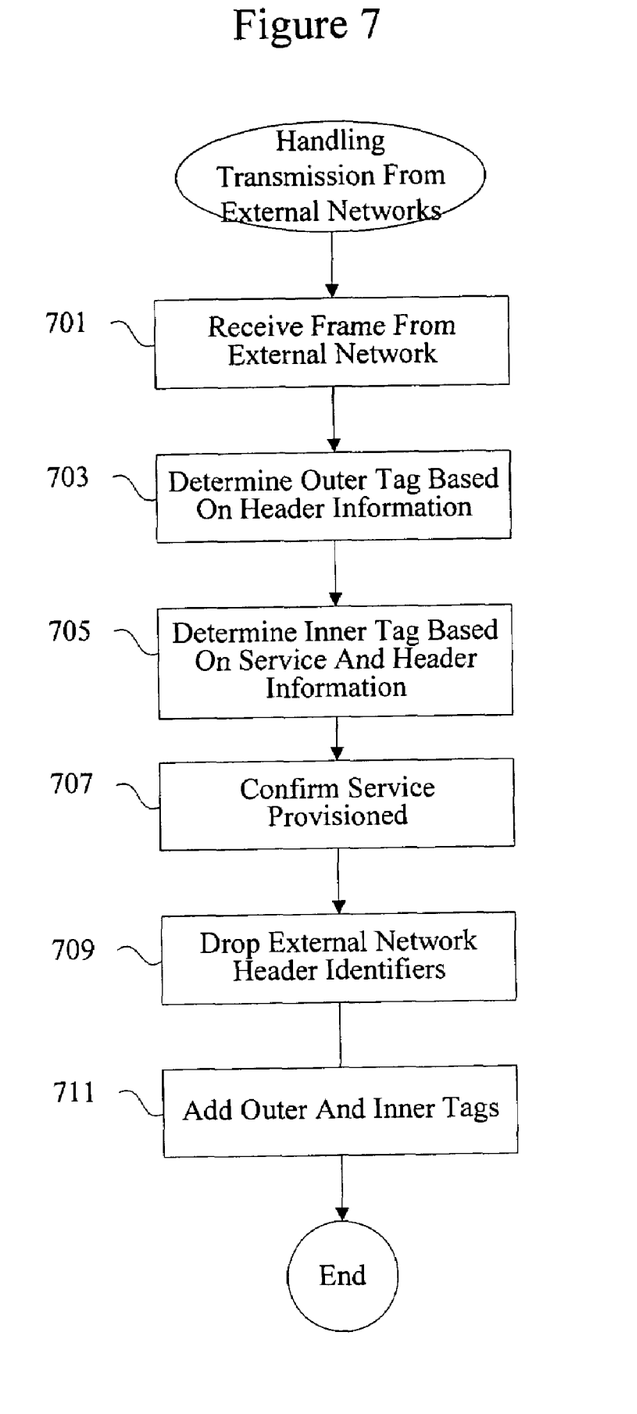
FIG. 7 is a flow process diagram showing receive frame handling.

FIG. 7 is a flow process diagram showing frame processing for data received from an external network. At 701, the frame is received from an external network such as an ATM network, an MPLS network, a frame relay network, or an IP network. At 703, destination information associated with the received frame is identified to determine the appropriate outer tag needed for transmission onto the Metro Ethernet network. For example, destination information in the header of an ATM cell may be analyzed to determine that the frame should be transmitted to a particular customer site. The outer tag identifying the customer site is then determined. At 705, a virtual circuit may be checked in order to determine an inner tag. According to various embodiments, various circuit switched networks include a virtual circuit identifier corresponding to particular reserved inner tag values.

The bridge determines what particular inner tag value should be used for transmission onto the Metro Ethernet network. In other examples, the received frame or received packet may not include a virtual circuit identifier and instead the bridge merely indicates the type of network or service associated with the received frame. For example, if the frame is received from an MPLS network, the inner tag associated with the MPLS service is identified. The bridge can also confirm that services are provisioned for the particular customer site at 705. ATM header, tunnel header, or other header identifiers are then removed at 709 and the information removed is used to add new Ethernet headers, outer tags, and inner tags at 711.

Figure 8:
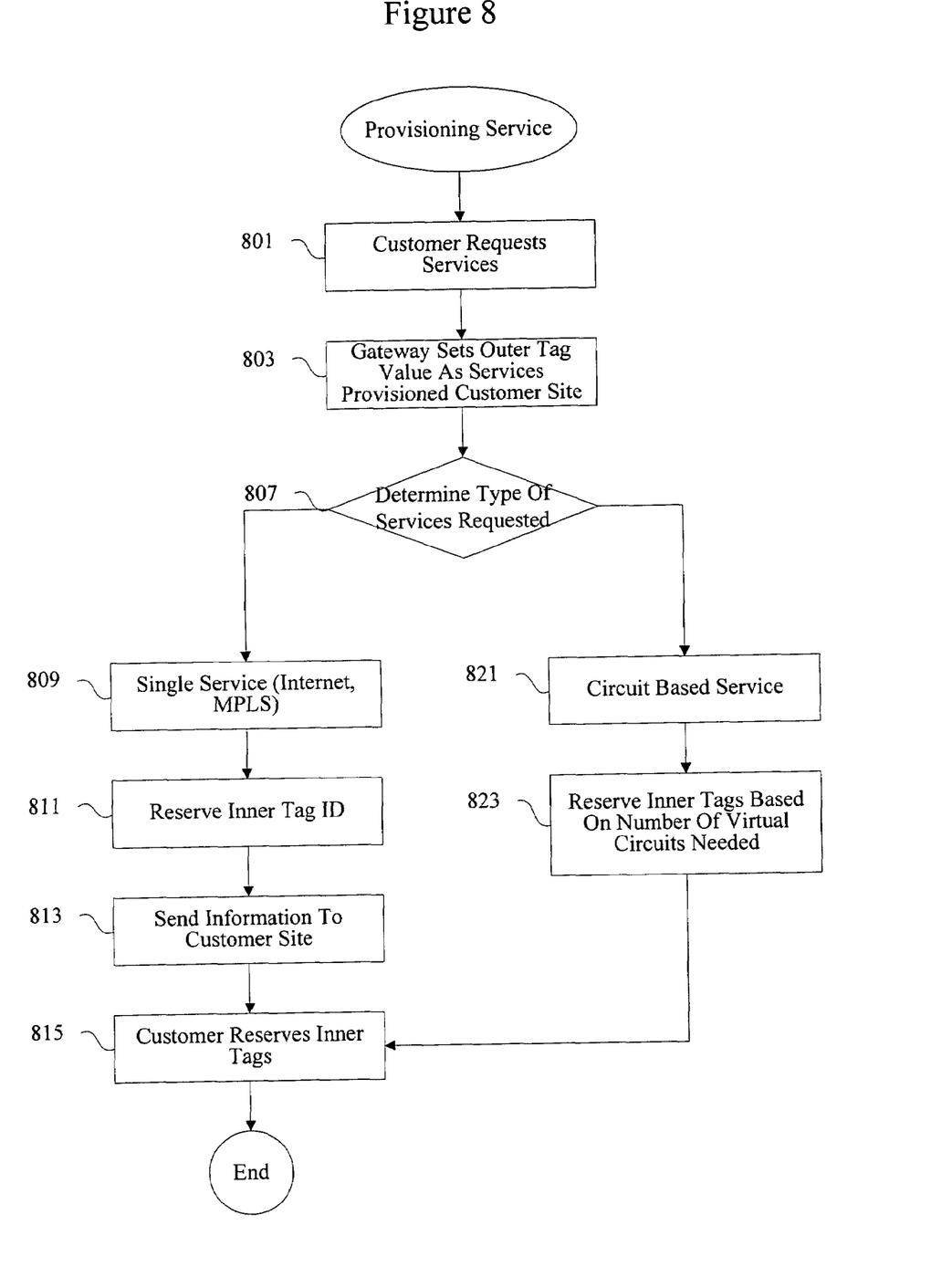
FIG. 8 is a flow process diagram showing provisioning of services.

FIG. 8 is a flow process diagram showing provisioning of services. At 801, the customer site requests services, such as frame relay services, and TLS services, etc. 803, the bridge between the Metro Ethernet network and an external network sets the outer tag value associated with the customer site as a value having services provisioned. At 807, the bridge determines the type of services requested. If the services of circuit based service such as ATM and at 821, inner tags are reserved based on the number of circuits needed. If the service requests it is a non-circuit based service such as Internet or TLS at 809, a particular inner tag ID is reserved at 811. The reserved inner tag information is set to the customer site at 813 and 815 the customer can then proceed to the reserved inner tags so that the inner tag can be used to identify services, instead of identifying particular subnetworks.

The techniques of the present invention for mapping reserved inner tags to particular provisioned services can be implemented on a variety of different systems. In one embodiment, the techniques of the present invention can be implemented on a Cisco 7600 series Internet router supporting high-speed WAN aggregation. The Internet router includes processors in memory for performing various mapping functions. The Internet router can also have various optical, wireless, and cable interfaces to a variety of different networks.

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the techniques of the present invention may be implemented on a general-purpose programmable machine selectively activated or reconfigured by a computer program stored in memory. Such programmable machine may be a network device designed to handle network traffic, such as, for example, a router or a switch. Such network devices may have multiple network interfaces including frame relay and ISDN interfaces, for example. Specific examples of such network devices include routers and switches. For example, the mapping mechanism of the present invention may be specially configured routers or servers such as specially configured router models 1600, 2500, 2600, 3600, 4500, 4700, 7200, 7500, 7600 and 12000 available from Cisco Systems, Inc. of San Jose, Calif. A general architecture for some of these machines will appear from the description given below. In an alternative embodiment, techniques may be implemented on a general-purpose network host machine such as a personal computer or workstation. Further, the invention may be at least partially implemented on a card (e.g., an interface card) for a network device or a general-purpose computing device.

Figure 9:
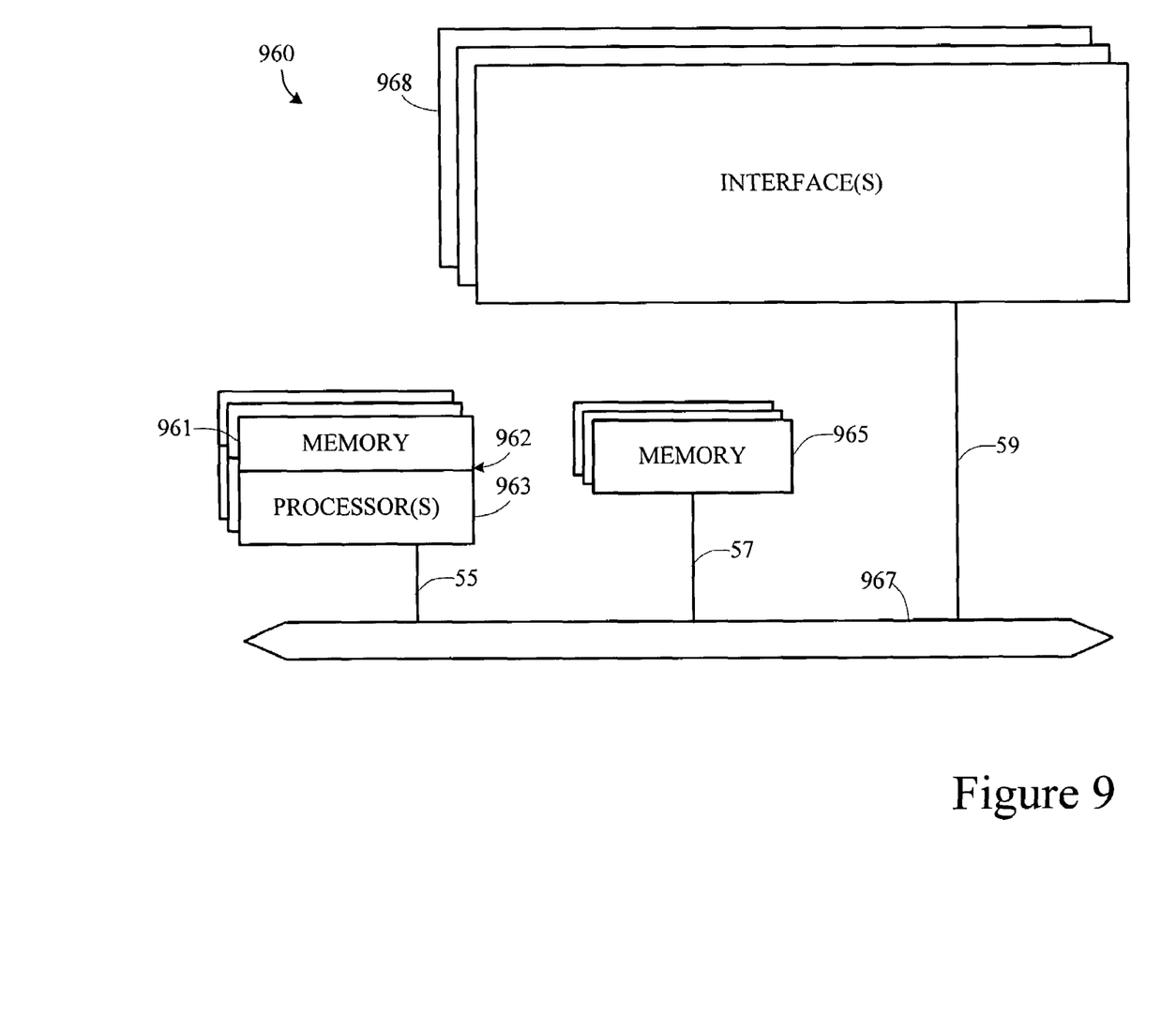
FIG. 9 is a diagrammatic representation showing a router.

Referring now to FIG. 9, a network device 960 suitable for implementing the techniques of the present invention includes a master central processing unit (CPU) 962, interfaces 968, and a bus 967 (e.g., a PCI bus) or an interconnect. When acting under the control of appropriate software or firmware, the CPU 962 may be responsible for implementing specific functions associated with the functions of a desired network device. For example, when configured as a gateway device, the CPU 962 may be responsible for removing tags, determining services associated with tags, and replacing tags with other forms of header information. The CPU 962 preferably accomplishes all these functions under the control of software including an operating system, and any appropriate applications software.

CPU 962 may include one or more processors 963 such as a processor from the Motorola family of microprocessors or the MIPS family of microprocessors. In an alternative embodiment, processor 963 is specially designed hardware for controlling the operations of network device 960. In a specific embodiment, a memory 961 (such as non-volatile RAM and/or ROM) also forms part of CPU 962. However, there are many different ways in which memory could be coupled to the system. Memory block 961 may be used for a variety of purposes such as, for example, caching and/or storing data, programming instructions, etc.

The interfaces 968 are typically provided as interface cards (sometimes referred to as "line cards"). Generally, they control the sending and receiving of data packets over the network and sometimes support other peripherals used with the network device 960. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 962 to efficiently perform routing computations, network diagnostics, security functions, etc.

Although the system shown in FIG. 9 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 965) configured to store data, program instructions for the general-purpose network operations and/or other information relating to the functionality of the techniques described herein. The program instructions may control the operation of an operating system and/or one or more applications, for example. The memory or memories may also be configured to store data structures, mapping tables, and/or other specific non-program information described herein.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with multiple processor clusters connected through a point-to-point, switch, or bus architecture. In another example, multiple clusters of processors may share a single interconnection controller, or multiple interconnection controllers can be used in a single cluster. Therefore, the scope of the invention should be determined with reference to the appended claims.

What is claimed is:

1. A method for receiving frames at a gateway device, comprising:
   receiving a frame at a metro ethernet gateway coupled to a metro ethernet network and an external network, the frame having an outer tag value identifying a customer site in a metro ethernet network, an inner tag value in an inner tag field, an ethernet packet header, and an ethernet packet payload, wherein a first value for the inner tag field is mapped to a frame relay service, a second value for the inner tag field is mapped to an Ethernet service, and a plurality of values for the inner tag field are mapped to Asynchronous Transfer Mode (ATM) virtual circuits determining that the inner tag value identifies a service provisioned for the customer site; and
   replacing the outer tag and the inner tag with one or more identifiers for transmission onto the external network;
   wherein determining that the inner tag identifies a service provisioned for the customer comprises determining if the inner tag has a reserved value.

2. The method of claim 1, wherein the external network is an ATM network.

3. The method of claim 2, wherein the inner tag value identifies a service provisioned for the customer and a virtual circuit associated with an ATM network.

4. The method of claim 3, wherein the one or more identifiers are used to specify the virtual circuit.

5. The method of claim 1, wherein the external network is an IP network.

6. The method of claim 5, wherein the inner tag value identifies a provisioned IP network service.

7. The method of claim 6, wherein the outer tag and the inner tag are replaced with one or more identifiers for tunneling to an IP network.

8. The method of claim 1, wherein the metro ethernet network is a multiport layer 2 virtual private network.

9. The method of claim 1, wherein the inner tag and outer tag are QinQ tags.

10. A gateway device, comprising:
    an external network interface coupled to an external network; a metro ethernet network interface coupled to a metro ethernet network, the interface configured to receive a frame at a metro ethernet gateway coupled to a metro ethernet network and an external network, the frame having an outer tag value identifying a customer site in a metro ethernet network, an inner tag value in an inner tag field, an ethernet packet header, and an ethernet packet payload, wherein a first value for the inner tag field is mapped to a frame relay service, a second value for the inner tag field is mapped to an Ethernet service, and a plurality of values for the inner tag field are mapped to Asynchronous Transfer Mode (ATM) virtual circuits and
    a processor operable to determine that the inner tag value identifies a service provisioned for the customer site and to replace the outer tag and the inner tag with one or more identifiers for transmission onto the external network;
    wherein determining that the inner tag identifies a service provisioned for the customer comprises determining if the inner tag has a reserved value.

11. The gateway device of claim 10, wherein the external network is an ATM network.

12. The gateway device of claim 11, wherein the inner tag value identifies a service provisioned for the customer and a virtual circuit associated with an ATM network.

13. The gateway device of claim 12, wherein the one or more identifiers are used to specify the virtual circuit.

14. The gateway device of claim 10, wherein the external network is an IP network.

15. The gateway device of claim 14, wherein the inner tag value identifies a provisioned IP network service.

16. The gateway device of claim 15, wherein the outer tag and the inner tag are replaced with one or more identifiers for tunneling to an IP network.

17. The gateway device of claim 10, wherein the metro ethernet network is a multiport layer 2 virtual private network.

18. The gateway device of claim 10, wherein the inner tag and outer tag are QinQ tags.

19. A network node, comprising: means for receiving a frame at a metro ethernet gateway coupled to a metro ethernet network and an external network, the frame having an outer tag value identifying a customer site in a metro ethernet network, an inner tag value in an inner tag field, an ethernet packet header, and an ethernet packet payload, wherein a first value for the inner tag field is mapped to a frame relay service, a second value for the inner tag field is mapped to an Ethernet service, and a plurality of values for the inner tag field are mapped to Asynchronous Transfer Mode (ATM) virtual circuits
    means for determining that the inner tag value identifies a service provisioned for the customer site; and
    means for replacing the outer tag and the inner tag with one or more identifiers for transmission onto the external network;
    wherein determining that the inner tag identifies a service provisioned for the customer comprises determining if the inner tag has a reserved value.

20. A computer readable medium comprising computer instruction code for receiving frames at a gateway device, the computer instruction code executed by the computer, the computer readable medium comprising:
    computer code for receiving a frame at a metro ethernet gateway coupled to a metro ethernet network and an external network, the frame having an outer tag value identifying a customer site in a metro ethernet network, an inner tag value in an inner tag field, an ethernet packet header, and an ethernet packet payload, wherein a first value for the inner tag field is mapped to a frame relay service, a second value for the inner tag field is mapped to an Ethernet service, and a plurality of values for the inner tag field are mapped to Asynchronous Transfer Mode (ATM) virtual circuits
    computer instruction code for determining that the inner tag value identifies a service provisioned for the customer site; and
    computer instruction code for replacing the outer tag and the inner tag with one or more identifiers for transmission onto the external network;
    wherein determining that the inner tag identifies a service provisioned for the customer comprises determining if the inner tag has a reserved value.

* * * * *

UNITED STATES PATENT AND TRADEMARK OFFICE
CERTIFICATE OF CORRECTION

PATENT NO. : 7,633,937 B2  Page 1 of 1
APPLICATION NO. : 10/664591
DATED : December 15, 2009
INVENTOR(S) : Wu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1490 days.

Signed and Sealed this

Twenty-first Day of December, 2010

David J. Kappos
*Director of the United States Patent and Trademark Office*